United States Patent [19]
Kitano

[11] 3,851,564
[45] Dec. 3, 1974

[54] PORTABLE SCREW CUTTING MACHINE

[76] Inventor: Yoshizo Kitano, 78, 2-Chome Daimon Chikusa Ku, Nagoya, Japan

[22] Filed: Nov. 26, 1973

[21] Appl. No.: 419,209

Related U.S. Application Data
[63] Continuation-in-part of Ser. No. 217,894, Jan. 14, 1972, abandoned.

[52] U.S. Cl.............. 90/11.52, 90/11.54, 90/11.58, 90/11.64, 90/12 R, 10/105
[51] Int. Cl.......................... B23g 1/02, B23g 1/24
[58] Field of Search............... 90/11.5, 11.52, 11.54, 90/11.58, 11.64, 12 R; 10/105, 139 R

[56] References Cited
UNITED STATES PATENTS

| | | | |
|---|---|---|---|
| 1,507,235 | 9/1924 | Hall | 90/11.54 |
| 2,691,921 | 10/1954 | Burgsmuller | 90/11.64 |
| 3,621,754 | 11/1971 | Ditson | 90/11.58 |

*Primary Examiner*—Gil Weidenfeld
*Attorney, Agent, or Firm*—Dennison, Dennison, Townshend & Meserole

[57] ABSTRACT

A portable machine for cutting an external thread on a stationary workpiece. A cutting tool is held by a cutting tool holder to form a thread having a predetermined lead angle on the workpiece. The angular position of the cutting tool relative to the workpiece is adjustable to provide a predetermined cutting depth. The cutting tool is adapted to revolve around the workpiece at a relatively high speed, while at the same time axially moving along the workpiece and revolving around the workpiece at a relatively low speed to form a continuous thread having a predetermined lead on the workpiece.

15 Claims, 13 Drawing Figures

PORTABLE SCREW CUTTING MACHINE

RELATED APPLICATION

This application is a Continuation in Part of applicant's copending application Ser. No. 217,894 filed on Jan. 14, 1972 now abandoned.

BACKGROUND OF THE INVENTION

This invention relates to a portable machine for cutting a thread on a stationary workpiece.

According to known thread cutting techniques, a cutting tool is only moved axially relative to a rotating workpiece to cut a thread thereon. There are, however, many workpieces which are too complicated in shape to be successfully held for rotation. Such known techniques are also unsuitable for cutting a thread on a big workpiece which is difficult to rotate. In view of these problems, a number of apparatuses have been proposed to form a thread on a stationary workpiece by rotating a cutting tool around the workpiece. But those known apparatuses are very complicated in construction. Known thread cutting techniques also require complicated apparatus if they are to be employed in forming a thread on a tapered workpiece.

SUMMARY OF THE INVENTION

It is, therefore, an object of this invention to provide a portable machine for easily cutting a thread on a workpiece having a complicated shape.

It is another object of this invention to provide a portable machine whereby a thread can easily be cut on a stationarily positioned workpiece which is too large to be rotated successfully.

It is still another object of this invention to provide a portable machine which is simple in construction and yet can easily cut a thread on a tapered workpiece.

Other objects and advantages of this invention will become apparent from the detailed description and the accompanying drawings.

DETAILED DESCRIPTION

Referring to the drawings more particularly, a portable thread cutting machine according to this invention is generally indicated at C. The machine C includes a box frame 2 having a front wall 2a and a rear wall 2b. A hollow cylindrical shaft 1 is slidably mounted in the box frame 2 and the opposite ends of the shaft 1 extend through the front and rear walls 2a and 2b of the box frame 2 respectively. The shaft 1 is rotatable and axially movable as will hereinafter be described in further detail. A support ring 4 is secured to the peripheral surface of the shaft 1 in the box frame 2 and provided on its outer surface with a groove 3 for loosely receiving a movable plate 84 to be hereinafter described. An annular flange member 5 having an axial bore 6 is coaxially attached to the front end of the hollow shaft 1 which extends outwardly from the front wall 2a of the box frame 2. The flange member 5 is formed on its outer surface with a vertically extending dovetail groove 7 which encircles the axial bore 6. A pair of laterally spaced, relatively elongate frame members 8 are integrally attached to the top of the flange member 5 and extend in parallel relation away from the front wall 2a of the box frame 2. A groove 9 having a square cross section is formed on each of the opposite inner surfaces 8a of the frame members 8. The two square grooves 9 extend in parallel relation on a common horizontal plane. The front wall 2a is formed on its outer surface with an annular shoulder on which a ring member 10 is supported and secured to the front wall 2a by bolts 10a.

Figure 3:
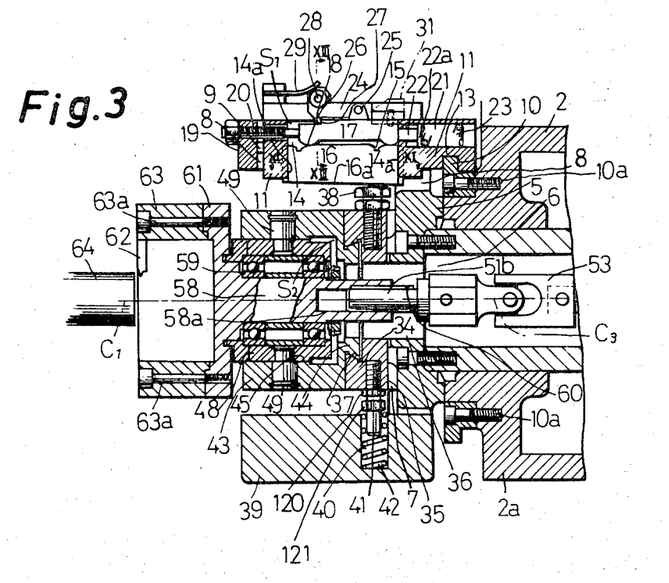
FIG. 3 is a sectional view taken on line III—III of FIG. 2 and showing in vertical section the front half of the machine shown in FIG. 1.

A rotatable support member 11 is rotatably positioned between the two frame members 8. The rotatable support member 11 is formed on its outer surface with a pair of projections 12 which are disposed opposite to each other and extend into the two square grooves 9, respectively, of the frame members. The member 11 is further provided on its rear end portion adjacent to the front wall 2a of the box frame 2 with a groove 13 in which the ring member 10 is loosely fitted. Thus, the frame members 8 and the rotatable support member 11 are rotatable with the hollow shaft 1. The frame members 8 are rotatable upon rotation of the hollow shaft 1 and also reciprocable with the axial movement of the shaft 1 as the grooves 9 of the frame members 8 are slidable on the projections 12 of the rotatable support member 11. The member 11 is rotatable upon rotation of the hollow shaft 1, but the ring member 10 prevents reciprocal movement of the member 11 with the axial movement of the shaft 1. As shown in FIG. 3, the rotatable support member 11 is shaped substantially in the form of an inverted letter "U" in side elevation and has a pair of opposite end walls 14a. The end walls 14a define therebetween an open inner space 14 in which a templet 16 is slidable mounted. Each end wall 14a is formed on its inner surface with a vertical groove 14b, and the templet 16 is formed with a vertical ridge 16b on either end thereof. The two ridges 16b of the templet 16 are slidably received in the two grooves 14b respectively to permit the templet 16 to slide relative to the member 11. The templet 16 has a bottom 16a which extends below the bottom of the member 11.

Figure 2:
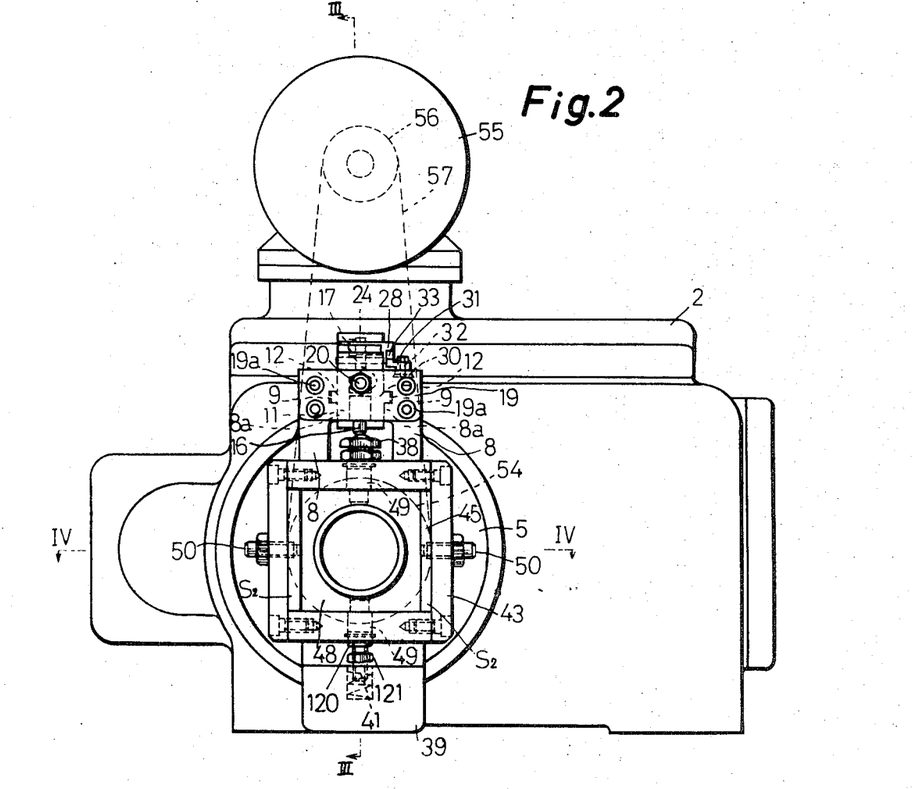
FIG. 2 is a front elevational view of the machine shown in FIG. 1.

The templet 16 is formed on its top with a pair of tapered grooves 15 extending laterally in parallel relation. A movable element 17 is disposed in the inner space 14 of the member 11 in a position above the templet 16 as shown in FIG. 3. The movable element 17 is somewhat smaller in length than the templet 16, so that there is left a clearance $S_1$ between the front (left in FIG. 3) end of the element 17 and the front end wall 14a of the member 11 as shown in FIG. 3, and the element 17 is movable along its length. The movable element 17 is provided at its bottom with a pair of tapered ridges 18 extending laterally in parallel relation which are engageable with the grooves 15 of the templet 16 upon movement of the element 17 to the left in FIG. 3. The grooves 15 and the ridges 18 are kept in disengaged relation as shown in FIG. 3 during the thread forming operation of the apparatus. A plate 19 is attached to the front ends of the frame members 8 by four bolts 19a as illustrated in FIG. 2. An adjusting bolt 20 extends through the upper middle portion of the plate 19 and is secured thereto. The inner end of the adjusting bolt 20 extends through a hole formed in the front end wall 14a of the member 11 and having a somewhat larger diameter than the bolt 20, and is engaged with the front end of the movable element 17 as shown in FIG. 3.

Figure 13:
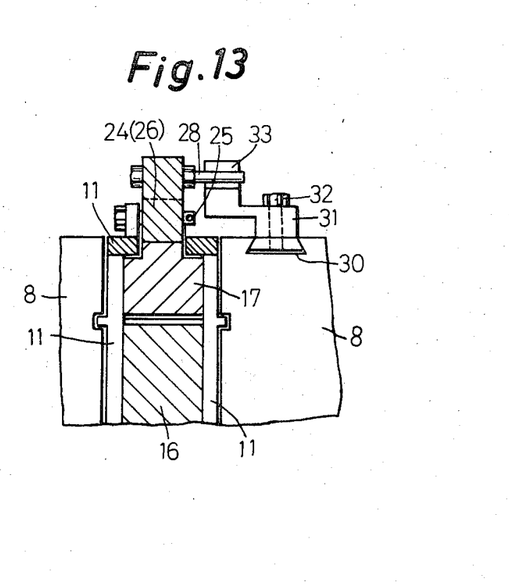
FIG. 13 is a fragmentary enlarged sectional view taken on line XIII—XIII of FIG. 3.

The rear end portion of the rotatable support member 11 as defined by its rear end wall 14a is formed with a longitudinal bore 21 having a circular cross section as shown in FIG. 3. A regulating rod member 22 is provided in the cylindrical bore 21. The rear end wall 14a of the member 11 is formed with a hole having a diamter smaller than the bore 21 but slightly larger than the rod member 22, in which hole the rod member 22 is slidably received at one end. A coil spring 23 is provided in the bore 21 and one end of the spring 23 is engaged with the other end of the rod member 22 with a washer 22a therebetween, so that the spring 23 urges the rod member 22 against the movable element 17. The one end of the rod member 22 is thus maintained in engagement with the rear end of the movable element 17 as shown in FIG. 3. A pawl plate 24 is pivotally attached by a pin 25 to the top of the rotatable support member 11 and is disposed above the movable element 17 as shown in FIG. 3. The pawl plate 24 is formed at its free end with a downwardly extending pawl 26. The movable element 17 is formed on its top surface with a laterally extending shoulder 27, and the pawl 26 is engageable with the shoulder 27 as illustrated in FIG. 3. The free end of the pawl plate 24 is also provided with a laterally extending pin 28 above the pawl 26. A leaf spring 29 is attached to the top of the rotatable support member 11, and the free end of the spring 29 is resiliently positioned on the free end of the pawl plate 24 as shown in FIG. 3 to urge the pawl plate 24 downwardly. A dovetail groove 30 is formed in the upper surface of one of the frame members 8 along the length thereof as illustrated in FIG. 13. A member 31 having a substantially S-shaped vertical cross section (FIG. 13) is screwed down to the frame member 8 at 32 and adapted to disengage the pawl 26 from the shoulder 27 of the movable element 17. The pawl disengaging member 31 is formed at its lower end with a dovetail which is loosely received in the dovetail groove 30. Accordingly, the relative position of the member 31 to the frame member 8 is adjustable, and after the position of the member 31 is determined relative to the frame member 8, the screw 32 is tightened to hold the member 31 in a fixed position on the frame member 8. The pawl disengaging member 31 is formed with a tapered upper end 33 as best shown in FIG. 3. The member 31, which is secured to the frame member 8 by the screw 32, is movable to the pawl plate 24 with the axial movement of the frame member 8 and the tapered upper end 33 is engageable with the pin 28 on the lower face thereof. With a further advance of the member 31, the tapered upper end 33 pushes up the pin 28 against the force of the leaf spring 29 to thereby disengage the pawl 26 from the movable element 17.

Figure 12:
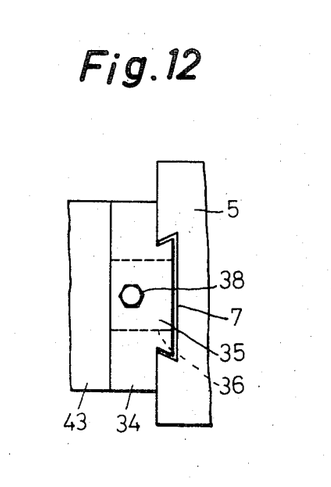
FIG. 12 is a top plan view showing an annular flange and a head holder connected by dovetail joints as more generally shown in FIG. 3.

A head holder 34 is attached to the flange member 5 and has an axial bore 36 which is coaxial with the bores of the flange member 5 and the hollow shaft 1 as illustrated in FIG. 3. The head holder 34 is formed with a vertically extending dovetail 35 on one side thereof which faces the flange member 5, as illustrated in FIG. 12. The dovetail 35 encircles the axial bore 36 and is slidably engaged with the dovetail groove 7 of the flange member 5. As shown in FIG. 3, the head holder 34 is formed on its opposite side or outer surface with a horizontally extending dovetail groove 37 which is substantially perpendicular to the dovetail 35 and encircles the axial bore 36. A stylus member 38 is secured to a peripheral portion of the head holder 34 and is perpendicular to the axial bore 36 as illustrated in FIGS. 3 and 12. The stylus member 38 is movable along the bottom surface 16a of the templet 16 with the axial movement of the hollow shaft 1. A counterbalancing bracket 39 is secured to the bottom of the flange member 5 in a position diametrically opposite to the frame members 8 as shown in FIG. 3. The bracket 39 is provided with a vertically extending elongate hole 40 as shown in FIG. 3. The hole 40 is vertically aligned with the stylus member 38 as illustrated in FIG. 3, and a compression spring 42 is fitted in the hole 40. A stud 41 is attached at one end to the head holder 34 in a diametrically opposite position to the stylus member 38. The other end of the stud 41 extends into the hole 40 of the bracket 39 and is encircled by the spring 42. A pair of nuts 120 and 121 are screwed on the stud 41 as shown in FIG. 3. The upper nut 120 is engaged with the lower peripheral portion of the head holder 34 to hold the stud 41 in an adjustably fixed position on the head holder 34. The lower nut 121 is engaged by the upper end of the spring 42, so that the spring 42 urges the stud 41 upwardly. As by means of the dovetail joints 7 and 35 the head holder 34 is vertically movable relative to the flange member 5, the head holder 34 is urged upward by the spring 42 to maintain the upper end of the stylus member 38 in engagement with the bottom surface 16a of the templet 16.

Figure 1:
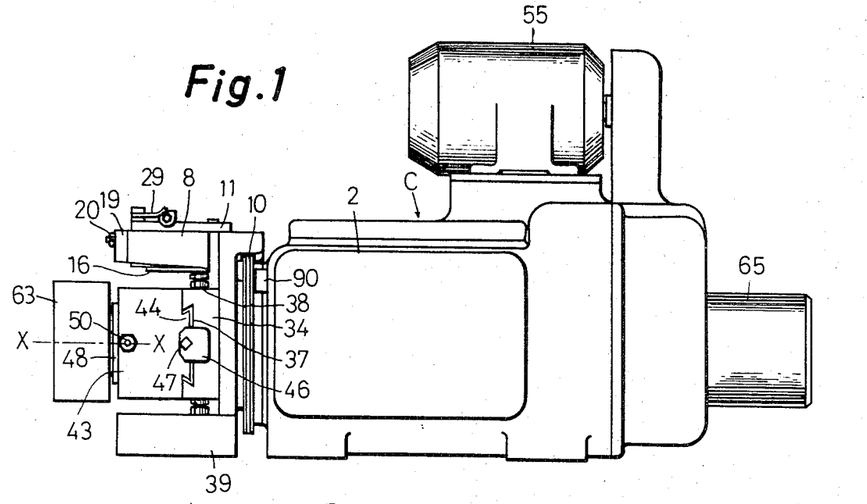
FIG. 1 is a side elevational view of a thread cutting machine in a preferred form of this invention.
Figure 8:
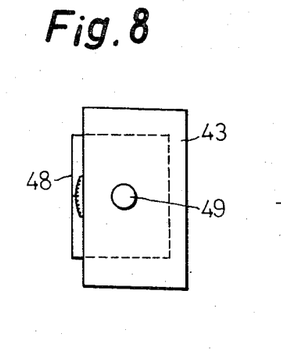
FIG. 8 is a fragmentary enlarged top plan view of the machine shown in FIG. 3.

A head member 43 is slidably mounted on the head holder 34. This slidable connection is achieved by a dovetail 44 formed on one vertical end surface facing the head holder 34 and the dovetail groove 37 of the head holder 34 in which the dovetail 44 is horizontally slidably received. The head member 43 is provided with an axial bore 45. The axial bore 45 has a square cross section throughout the greater part thereof, but toward its end facing the head holder 34, the axial bore 45 diminishes into a bore portion having a circular cross section. The circular portion of the bore 45 is encircled by the dovetail 44 and coaxially communicates with the axial bore 36 of the head holder 34 as illustrated in FIG. 3. A holder plate member 46 is attached at one end to the outer surface of each of two opposite side walls of the head holder 34 as illustrated in FIG. 1 (by a bolt not shown). The other end of each member 46 extends closely along one side wall of the head 43 and carries an adjusting bolt 47 as illustrated in FIG. 1. The adjusting bolt 47 is received in a threaded hole provided in the side wall of the head 43, and provides means for controlling the lateral positional adjustment of the head 43 relative to the head holder 34. A square cylinder 48 is received in the square bore 45 of the head 43 and pivotally supported by a pair of pins 49 which are vertically aligned with each other, as illustrated in FIGS. 2 and 3. One of the pins 49 extends through the top walls of the head member 43 and the square cylinder 48, while the other pin 49 extends through the bottom walls of the head member 43 and the cylinder 48, as illustrated in FIG. 3. In order to permit the pivotal movement of the square cylinder 48 about the pins 49, there is provided a clearance $S_2$ substantially surrounding the cylinder 48 in the bore 45 as illustrated in FIGS. 2 and 3. A clamping bolt 50 is received in a threaded hole formed through each of the opposite side walls of the head member 43. The two clamping bolts 50 are horizontally aligned with each other as shown in FIG. 2 and are located in a common horizontal plane in which the longitudinal axis X—X of the head member 43 lies, as illustrated in FIG. 1. The clamping bolts 50 are positioned closer to the front end of the head member 43 than the pins 49 are, as is apparent from FIGS. 1 and 3. The clamping bolts 50 extend into the bore 45 and are engageable with the outer surfaces of the opposite side walls of the square cylinder 48 to provide adjustment for the pivotal movement of the square cylinder 48 and thereby for the lead of a thread to be formed. The square cylinder 48 projects from the head member 43 as illustrated in FIGS. 1 and 3, and graduations are provided on the projecting portion of the cylinder 48 so that the amount of the pivotal movement of the cylinder 48 relative to the head member 43 can be visually ascertained, as shown in FIG. 8.

Figure 4:
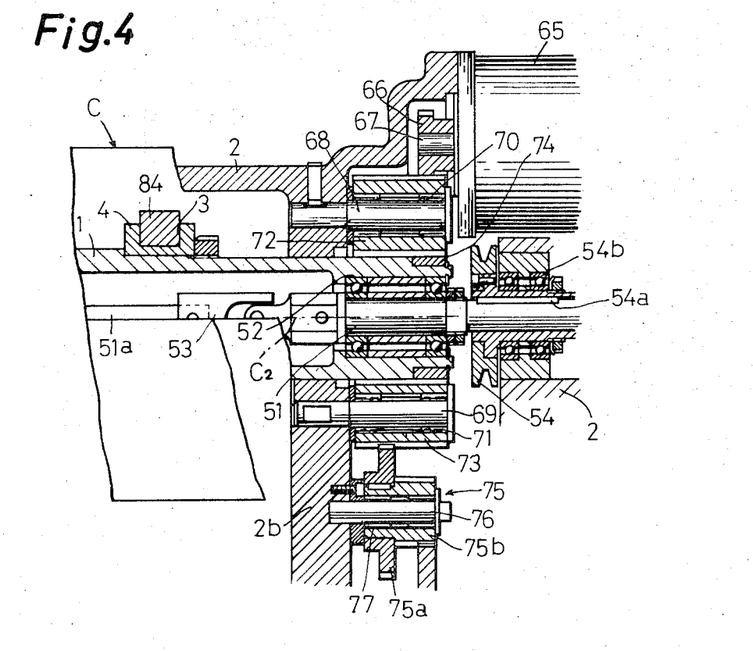
FIG. 4 is a sectional view taken on line IV—IV of FIG. 2 and showing in horizontal section the rear half of the machine shown in FIG. 1; 1;2
Figure 5:
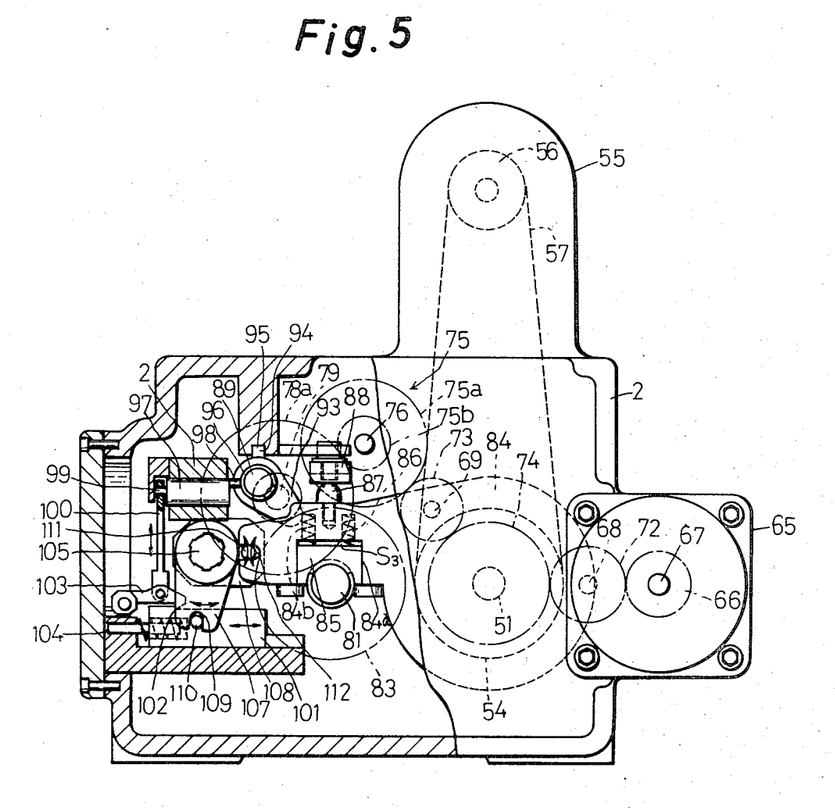
FIG. 5 is a rear elevational view of the machine shown in FIG. 1.

Referring to FIG. 4, bearings 52 are fitted in the hollow shaft 1 adjacent to its rear end as illustrated in FIG. 4, and a rear spindle 51 is rotatably supported by the bearings 52. One end of the rear spindle 51 is operationally connected by a universal joint 53 to one end of an intermediate spindle 51a. The other end of the intermediate spindle 51a is operationally connected by another universal joint 53 to one end of a front spindle 51b as shown in FIG. 3. A driven pulley 54 is slidably keyed at 54a on the other end of the rear spindle 51 and supported by bearings 54b on the box frame 2 as illustrated in FIG. 4. A first motor 55 is mounted on the box frame 2 as schematically shown in FIG. 5, and a driving pulley 56 is connected to the motor 55. A belt 57 is passed around the driving and driven pulleys 56 and 54 to transmit the rotation of the motor 55 to the driven pulley 54.

Referring again to FIG. 3, bearings 59 are fitted in the square cylinder 48, and a driving shaft 58, which is coaxial with the square cylinder 48, is rotatably supported by the bearings 59. The driving shaft 58 is formed at one end with an axial hole 58a having a circular cross section. The axial hole 58a receives therein the other end of the front spindle 51b, which is slidably connected to the driving shaft 58 by a key 60. A flange 61 is formed on the other end of the driving shaft 58 and a recessed cutting tool holder 63 for holding a cutting tool 62 is removably attached to the flange 61 by bolts 63a as shown in FIG. 3. A workpiece on which a thread is formed by the cutting tool 62 is illustrated at 64.

Figure 6:
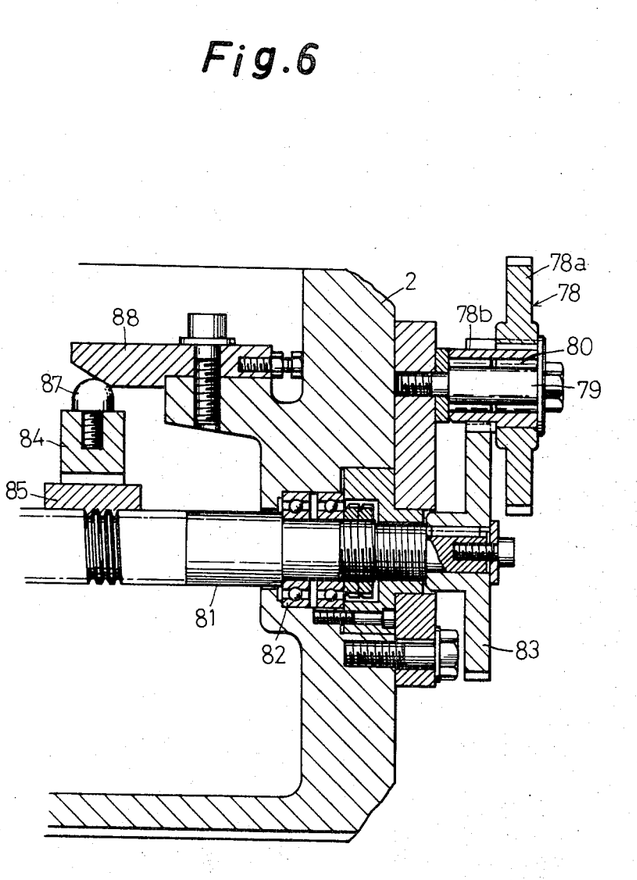
FIG. 6 is a fragmentary enlarged side elevational view, partly in section, of the machine showing a mechanism for axially moving a hollow shaft.

Description will now be made of a mechanism for axially moving the hollow shaft 1. Referring to FIGS. 4 and 5, a second motor 65 is mounted on the box frame 2 and includes an output shaft 67. A main gear 66 encircles the motor shaft 67. A first intermediate shaft 68 is secured to the box frame 2 and spaced above the hollow shaft 1, and a second intermediate shaft 69, which is also secured to the box frame 2, is spaced below the hollow shaft 1 and located diametrically opposite to the first intermediate shaft 68, as shown in FIG. 4. Bearings 70 encircle the first intermediate shaft 68 and a cylindrical intermediate gear 72 is supported on the bearings 70. Likewise, bearings 71 encircle the second intermediate shaft 69 and a cylindrical intermediate gear 73 is supported on the bearings 71. A spur gear 74 is secured to, and encircles the other end (rear extremity) of the hollow shaft 1. The spur gear 74 is engaged with the intermediate gears 72 and 73 and is movable a maximum allowable distance of about 55 mm with the axial movement of the hollow shaft 1. A first supporting shaft 76 is carried on the box frame 2 and a first variable speed gear assembly 75 is supported by bearings 77 on the first supporting shaft 76 as illustrated in FIG. 4. The first variable speed gear assembly 75 includes a first gear 75a and a second gear 75b, and the first gear 75a is engaged with the second intermediate gear 73 as shown in FIGS. 4 and 5. A second supporting shaft 79, which is also secured to the box frame 2, supports a second variable speed gear assembly 78 thereon by bearings 80 as illustrated in FIG. 6. The second variable speed gear assembly 78 includes a first gear 78a and a second gear 78b, and the first gear 78a is engaged with the second gear 75b of the first variable speed gear assembly 75 as shown in FIG. 5. A screw shaft 81 is supported on the box frame 2 by bearings 82 as shown in FIG. 6 and extends in parallel relation to the hollow shaft 1. As shown in FIG. 6, a driven gear 83 is secured to one end of the screw shaft 81 and engaged with the second gear 78b of the second variable speed gear assembly 78. The movable plate 84 is shaped like a key as illustrated in FIG. 5 and movably received in the annular groove 3 of the support ring 4 secured to the hollow shaft 1 as shown in FIG. 4. The movable plate 84 extends over the screw shaft 81 and is formed with a downwardly facing rectangular cut 84a which partly encircles the screw shaft 81, as illustrated in FIG. 5. An insert member 85 is vertically slidable in the rectangular cut 84a and is formed with a semi-circular groove at its bottom along its length as illustrated in FIG. 5. The insert member 85 is formed with a spirial groove in its semi-circular groove, and this spiral groove is engageable with the thread on the screw shaft 81 as illustrated in FIG. 6. A plurality of vertical holes 84b are formed in the movable plate 84 and located above the rectangular cut 84a. A spring 86 is positioned in each hole 84b and urges the insert member 85 downwardly against the screw shaft 81 as shown in FIG. 5. A clearance $S_3$ is provided between the bottom of the rectangular cut 84a and the top of the insert member 85 to allow upward displacement of the insert member 85 in the cut 84a against the force of the springs 86. An abutment member 87 is secured to the movable plate 84 above the insert member 85, as illustrated in FIGS. 5 and 6. A stop member 88 is secured in the box frame 2 and extends horizontally above the movable plate 84 as illustrated in FIGS. 5 and 6. The abutment member 87 is engageable with the stop member 88 upon movement of the movable plate 84 into the space below the stop member 88, so that the stop member 88 can press down the movable plate 84 or tilt it down about the holllow shaft 1 by overcoming the force of the springs 86.

Figure 7:
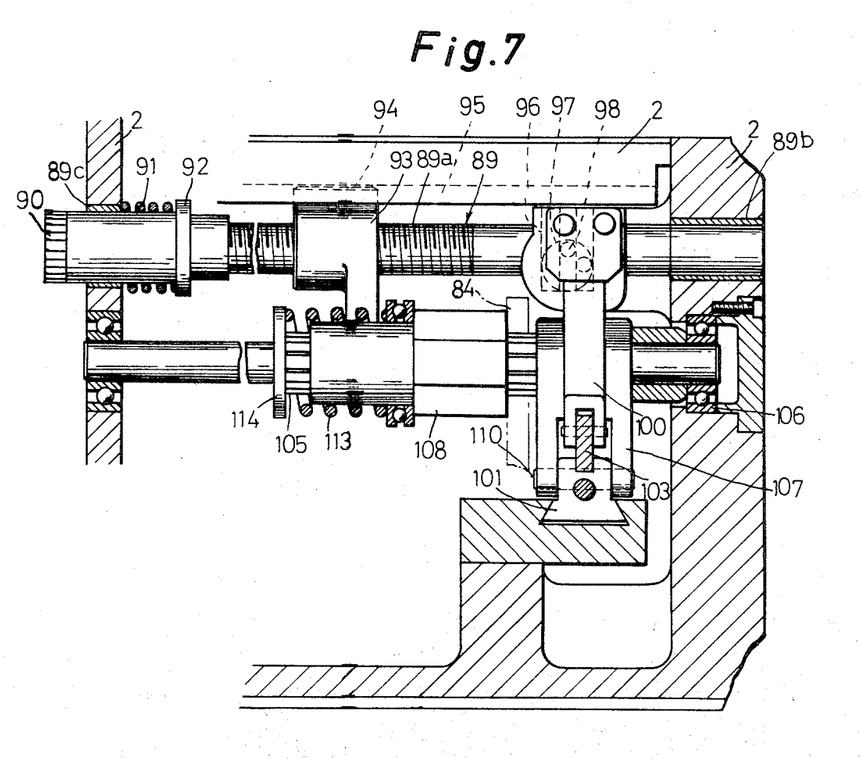
FIG. 7 is a view similar to FIG. 6 showing a mechanism for stopping the axial movement of the hollow shaft.

Description will now be made with respect to a mechanism for stopping the axial movement of the hollow shaft 1. A transfer shaft 89 is supported on the box frame 2 by bearings 89b at one end and by bearings 89c at the other end as shown in FIG. 7. The transfer shaft 89 is disposed in parallel relation to the screw shaft 81 as illustrated in FIG. 5, and is rototable and axially movable. The other end of the transfer shaft 89 supported on the bearings 89c projects from the box frame 2 as shown in FIG. 7 and carries a dial 90 graduated for indicating the amount of axial movement of the hollow shaft 1. The transfer shaft 89 includes a radially projecting flange portion 92 formed thereon in a position adjacent to the wall of the box frame 2 in which the transfer shaft 89 is supported by the bearings 89c. A compression spring 91 is interposed between the wall of the box frame 2 and the flange portion 92 to urge the transfer shaft 89 backward (to the right in FIG. 7). The transfer shaft 89 further includes a threaded portion 89a intermediate the ends thereof as shown in FIG. 7. A stopper 93 having a threaded circular bore is screwed on the threaded portion 89a of the shaft 89. The stopper 93 is engageable with the movable plate 84 as the latter moves forward (to the left in FIG. 7). The stopper 93 is provided on its top with a projection 94. An elongate guide member is secured to the inner surface of the top wall of the box frame 2 and extends in parallel relation to the transfer shaft 89 as illustrated in FIG. 7. The guide member is formed at its bottom with an elongate guide groove 95 along its entire length as shown in FIGS. 5 and 7, and the projection 94 on the stopper 93 is slidably received in the guide groove 95. A pair of rings 96 encircle the transfer shaft 89 in secured relation thereto and are positioned adjacent to the opposite end wall of the box frame 2 in which the shaft 89 is supported by the bearings 89b. A short shaft 97 having a circular cross section is rotatably supported on the box frame 2 and extends at right angles to the transfer shaft 89. A pin 98 having a circular cross section which is eccentric relative to the short shaft 97 as shown in FIGS. 5 and 7 projects from one end of the shaft 97 in the direction in which the shaft 97 extends. The free end of the pin 98 is interposed between the two rings 96 as illustrated in FIG. 7. Another pin 99 having a circular cross section which is eccentric relative to the shaft 97 and the pin 98 as shown in FIG. 7 projects from the other end of the shaft 97 as shown in FIG. 5. A connecting member 100 is attached to the pin 99 at its upper end as shown in FIG. 5. A slide member 101 formed with a dovetail at its bottom as shown in FIG. 7 is slidably received in a dovetail groove formed on the box frame 2 and extends in parallel relation to the shaft 97 as illustrated in FIG. 5. The slide member 101 is formed with a shoulder 102 on the top thereof. A latch member 103 is pivotally attached to the box frame 2 at one end and formed with a pawl at the other end as illustrated in FIG. 5. The latch member 103 is connected with the lower end of the connecting member 100 intermediate the ends thereof as shown in FIG. 5. The pawl on the latch member 103 is detachably engaged with the shoulder 102 of the slide member 101 as illustrated in FIG. 5. The slide member 101 is provided with an axial hole at one end, and a coil spring 104 is positioned in this axial hole as shown in FIG. 5 to urge the slide member 101 away from the adjacent side wall of the box frame 2 and maintain the pawl on the latch member 103 in engagement with the shoulder 102. A spline shaft 105 is supported on the box frame 2 by bearings 106 as shown in FIG. 7 and extends at right angles to the slide member 101 and in parallel relation to the screw shaft 81 as illustrated in FIG. 5. Two arm members 107 and 108 are mounted on the spline shaft 105 and spaced from each other as shown in FIG. 7. The arm member 107 is bifurcated at its free or lower end as shown in FIG. 7 and inserted over the slide member 101. The bifurcated ends of the arm member 107 are provided with a pair of U-shaped cuts 109 which are horizontally aligned with each other across the slide member 101. A pin 110 laterally extends through the slide member 101 and projects from the opposite sides thereof as illustrated in FIG. 7. The opposite ends of the pin 110 are received in the U-shaped cuts 109 of the arm member 107 as shown in FIG. 5. The other arm member 108 is provided adjacent its free (right in FIG. 5) end with a laterally extending pin 111 projecting from one side thereof toward the rear end of the machine. The free end (left in FIG. 5) of the movable plate 84 is located behind the free end of the arm member 108 and formed with a U-shaped cut 112. The pin 111 on the arm member 108 is received in the U-shaped cut 112 as illustrated in FIG. 5. The arm member 108 is formed with an elongate boss on the opposite side thereof from the pin 111 as shown in FIG. 7, and the spline shaft 105 is provided with a radially projecting flange 114 intermediate the ends thereof. A compression spring 113 is inserted around the spline shaft 105 and the boss of the arm member 108 between the flange 114 and the arm member 108 as shown in FIG. 7 to urge the arm member 108 backward or to the right as viewed in FIG. 7.

Figure 9:
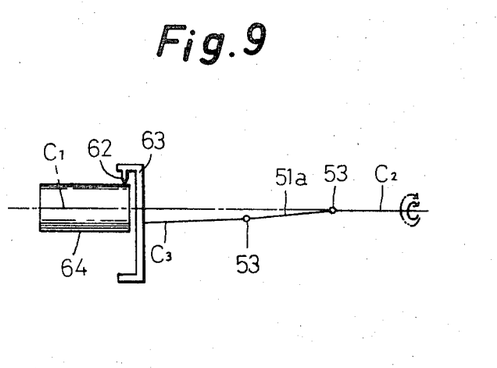
FIG. 9 is a view showing a cutting tool holder eccentrically positioned relative to a workpiece.

In operation, the workpiece 64 on which a thread is to be formed is placed in such a manner that its axial centerline $C_1$ may be aligned with the axial centerline $C_2$ of the hollow shaft 1 as illustrated in FIGS. 3, 4 and 9. In order that the cutting tool 62 may cut a thread on the workpiece 64 in a predetermined pattern, the head holder 34 is raised (which is possible because of the slidable connection between the dovetail 35 of the head holder 34 and the dovetail groove 7 of the flange member 5) to bring the stylus member 38 into abutting relation with the templet 16 as shown in FIG. 2 and the nut 120 is turned on the stud 41 to hold the head holder 34 in raised position and the stylus member 38 in engagement with the templet 16. The clamping bolts 50 on the opposite side walls of the head member 43 are loosened to liberate the square cylinder 48, and the square cylinder 48 and the cutting tool holder 63 are moved about the pins 49 to shift the position of the cutting tool 62 in accordance with the lead of the thread to be formed. The clamping bolts 50 are then tightened to hold the square cylinder 48 in the adjusted position. This adjustment moves the cutting tool 62 away from its cutting position on the workpiece 64 and therefore, further adjustment is made by the adjusting bolts 47 to slide the head member 43 laterally relative to the head holder 34 and thereby bring the cutting tool 62 back into operative position on the workpiece 64. As the result of these adjustments, the axial centerline $C_3$ of the cutting tool holder 63 which is coaxial with the front spindle 51b deviates from the axial centerline $C_1$ of the workpiece 64 which is coaxial with the hollow shaft 1, said centerline extending in an angularly inclined pattern as the centerline $C_3$ approaches the holder 63, as illustrated in FIG. 9. Accordingly, during the rotation of the hollow shaft 1, the centerline $C_3$ makes a conical configuration around an extension of the centerline $C_1$ of the workpiece 64 and the cutting tool 62 revolves around the centerline $C_1$ of the workpiece 64. In order to stop any further axial movement of the hollow shaft 1 when a predetermined length of thread has been cut on the workpiece 64, the dial 90 on the end of the transfer shaft 89, on which graduations are provided for adjusting the distance of the axial movement of the hollow shaft 1, is turned to rotate the transfer shaft 89 and move the stopper 93 on the transfer shaft 89 to a position corresponding to the length of the thread to be formed. As the result of this adjustment, the distance between the movable plate 84 and the stopper 93 (see FIG. 7) is so set that the movable plate 84 may abut against the stopper 93 when a predetermined length of thread has been cut on the workpiece 64. Likewise, the distance between the pin 28 on the pawl plate 24 and the pawl disengaging member 31 is set equal to the distance between the movable plate 84 and the stopper 93 by moving the member 31 relative to the frame member 8.

The machine is not ready for operation, and the first and the second motors 55 and 65 are operated. The rotation of the first motor 55 is transmitted through the driving pulley 56, the belt 57 and the driven pulley 54 to the rear spindle 51 to cause the rear spindle 51 to rotate at a high speed, so that the intermediate spindle 51a, the front spindle 51b, the driving shaft 58 and the cutting tool holder 63 which are operationally connected with each other are rotated at the same speed to cause the cutting tool 62 to revolve at a high speed about the centerline $C_3$ or axis of the front spindle 51b or the driving shaft 58. The rotation of the second motor 65 is transmitted through the main gear 66, the first intermediate gear 72 and the spur gear 74 to the hollow shaft 1 to cause the hollow shaft 1 to rotate at a low speed. The rotation of the hollow shaft 1 causes the cutting tool 62 to revolve around the axial centerline $C_1$ of the workpiece 64. Thus, the cutting tool 62 is caused to remove at a high speed around the centerline $C_3$ of the cutting tool holder 63, while simultaneously revolving at a low speed around the centerline $C_1$ of the workpiece 64 (see FIG. 9).

The rotation of the second motor 65 is also transmitted through the spur gear 74, the second intermediate gear 73, the first and second variable speed gear assemblies 75 and 78 and the driven gear 83 to the screw shaft 81 to rotate the screw shaft 81, so that the movable plate 84 having its insert member 85 engaged with the screw shaft 81 is moved forward to advance the hollow shaft 1 which is connected with the movable plate 84 by the support ring 4. Thus, the flange member 5, the head holder 34, the head 43, the sqaure cylinder 48, the driving shaft 58 and the cutting tool holder 63 which are all operationally connected with the hollow shaft 1 are moved forward to advance the cutting tool 62 along the workpiece 64. As the movable plate 84 moves forward, it pushes the arm member 108 forward by overcoming the force of the compression spring 113, so that the spring 113 may obtain a tendency to expand itself again to thereby return the arm member 108 and the movable plate 84 to their initial positions.

Figure 10:
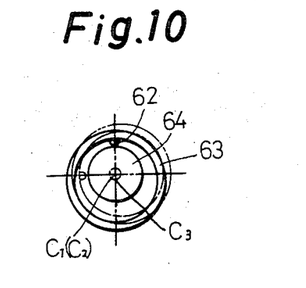
FIG. 10 is a view showing a mode in which a thread is being formed on the workpiece by a cutting tool.
Figure 11:
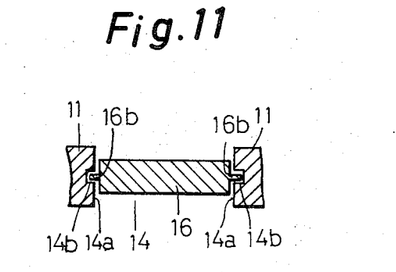
FIG. 11 is a sectional view taken on line XI—XI of FIG. 3.

As illustrated in FIG. 10, the cutting tool 62 is caused to revolve at a high speed by the rotation of the spindles 51, 51a and 51b around the axis $C_3$ of the cutting tool holder 63 which is eccentric relative to the workpiece 64, while at the same time revolving at a low speed by the rotation of the hollow shaft 1 around the axial centerline $C_1$ of the workpiece 64 and advancing along the workpiece 64 with the axial movement of the hollow shaft 1. The cutting tool 62 cuts a portion of the peripheral surface of the workpiece 64 during each rotation of the spindles 51, 51a and 51b. At the same time, the cutting tool 62 is caused by the rotation and axial movement of the hollow shaft 1 to slowly revolve around the workpiece 64 and progressively change its position relative to the workpiece 64. Accordingly, if the cutting tool makes a quarter revolution counter-clockwise around the workpiece 64 and changes its position from that shown by solid lines in FIG. 10 to that shown by broken lines, the cutting tool 62 cuts a continuous groove equal to a quarter of one turn of the thread to be formed, by intermittently hitting a peripheral portion of the workpiece 64 during each of repeated high speed rotations of the spindles 51, 51a and 51b. Thus, one rotation of the hollow shaft 1 permits the cutting tool 62 to cut one turn of thread on the workpiece 64, and as the axial movement of the hollow shaft 1 causes the cutting tool 62 to advance along the workpiece 64 at a rate so controlled as to produce a predetermined lead angle, one pitch of thread having a predetermined lead angle is formed on the workpiece 64 during each rotation of the hollow shaft 1. As the advancing movement of the cutting tool 62 is regulated by the head holder 34 in which the stylus member 38 is maintained by the compression spring 42 in engagement with the templet 16 and caused to slide on the bottom surface 16a of the templet 16 with the axial movement of the hollow shaft 1, the depth of the thread cut by the cutting tool 62 is determined by the shape of the templet 16, so that the machine according to this invention lends itself to formation of various types of screws, such as parallel or straight screws and taper screws, if the templet 16 is properly selected to suit a desired screw shape.

Although the invention is herein described with reference to an embodiment in which only one cutting tool is provided, it should be noted that this invention may equally be applied to a machine provided with more than one cutting tool. As a matter of fact, provision of a plurality of cutting tools along a common circumference on the cutting tool holder may be useful to improve the efficiency of thread forming operation, since the speed of rotation of the spindles can be reduced relative to the hollow shaft, depending on the number of the cutting tools provided.

The movable plate 84 moves forward with the axial movement of the hollow shaft 1 and abuts against the stopper 93 set in position for defining the end of travel of the cutting tool 62 along the workpiece 64 when a predetermined length of thread has been formed on the workpiece 64. At the same time, the pawl disengaging member 31 secured to and moving with the frame member 8 abuts against the pin 28 on the pawl plate 24 which does not move along its length because it is secured to the rotatable support member 11 held by the ring member 10 on the box frame 2 and incapable of axial movement. Thus, the pawl plate 24 is tilted outward about the pin 25 against the action of the leaf spring 29 to thereby disengage the pawl 26 from the shoulder 27 on the mavable element 17. As the frame members 8 are moved forward during the axial movement of the hollow shaft 1, the adjusting bolt 20 is disengaged from the movable element 17 and the mavable element 17 is moved forward by the action of the coil spring 23. The tapered projections 18 on the movable element 17 become aligned with the tapered grooves 15 on the templet 16, whereupon the head holder 34 laterally slidably carried on the flange member 5 and the templet 16 laterally slidably supported on the stylus member 38 are laterally moved by the action of the compression spring 42 with the projections 18 fitting the grooves 15, so that the cutting tool holder 63 is also moved laterally and the cutting tool 62 is separated from the workpiece 64.

As the movable plate 84 moves a farther distance forward after it has abutted against the stopper 93, the transfer shaft 89 is moved forward against the action of the spring 91 and the rings 96 secured to the transfer shaft 89 pull the pin 98 forward. This movement of the pin 98 causes the short shaft 97 to rotate forward (or counterclockwise as viewed in FIG. 7), so that the other pin 99 on the shaft 97 is moved upward and the connecting member 100 connected to the pin 99 is raised. This upward movement of the connecting member 100 tilts the latch member 103 upward, so that the pawl on the latch member 103 is disengaged from the shoulder 102 on the slide member 101, whereupon the slide member 101 is moved away from the latch member 103 (to the right in FIG. 5) by the action of the coil spring 104. With this movement of the slide member 101, the arm member 107 is turned in the same direction by the pins 110, so that the spline shaft 105 is rotated counterclockwise as viewed in FIG. 5 and the free end of the other arm member 108 is moved upward. With this upward movement of the arm member 108, the free end of the movable plate 84 is moved upward by the pin 111 and the insert member 85 on the movable plate 84 is disengaged from the screw shaft 81, whereupon the hollow shaft 1 ceases to move axially, and the operation of the motor 65 is stopped in any known manner.

When the movable plate 84 has been tilted upward and released from the screw shaft 81, the compression spring 113 expands and pushes back the arm member 108 to its initial position, so that the movable plate 84 is brought back to its initial position by the arm member 108 and the hollow shaft 1 is brought back to its initial position as the movable plate 84 pushes the support ring 4 backward. With the retraction of the hollow shaft 1, the frame members 8 also return to their initial positions, so that the adjusting bolt 20 on the frame members 8 projects into the support member 11 and abuts against the movable element 17 to thereby push back the movable element 17 against the action of the coil spring 23. The projections 18 on the movable element 17 are disengaged from the grooves 15 on the templet 16, so that the templet 16 and the head holder 34 are moved back laterally against the action of the spring 42. With the retraction of the frame members 8, the pawl disengaging member 31 is separated from the pin 28 on the pawl plate 24 and the pawl plate 24 is urged inwardly by the leaf spring 29 to thereby engage the pawl 26 with the shoulder 27 on the movable element 17. Upon retraction of the movable plate 84 to its initial position, the abutment member 87 on the movable plate 84 abuts against the stop member 88 on the box frame 2, and the movable plate 84 is tilted down by the stop member 88, so that the insert member 85 on the movable plate 84 is engaged with the screw shaft 81 again. Even if at that time the thread on the insert member 85 may fail to properly mesh with the thread on the screw shaft 81, proper engagement is obtained upon rotation of the screw shaft 81 during the next cycle of thread forming operation, because the insert member 85 is slidably received in the cut 84a and resiliently supported by the springs 86. Moreover, the downward tilt of the movable plate 84 is followed by restoration of the arm member 108, the spline shaft 105 and all the other associated members and parts to their respective initial positions, and at the same time, the transfer shaft 89 is returned to its initial position by the action of the spring 91, so that the short shaft 97, the connecting member 100 and all the other associated members and parts return to their respective initial positions and the latch member 103 is engaged with the shoulder 102 on the slide member 101.

It will be understood that the speeds of rotation and axial movement of the hollow shaft and of rotation of the spindles must be carefully correlated to each other for adjustment to allow formation of a continuous thread having a desired lead on the workpiece.

While the invention has been described with reference to a preferred embodiment thereof, it is to be understood that modifications or variations may be made by those skilled in the art without departing from the scope of the invention which is defined by the appended claims.

I claim:

1. A portable screw cutting machine comprising in combination a box frame, a hollow shaft having an axial centerline, means supporting said hollow shaft on said box frame, means for axially moving said hollow shaft with respect to said box frame in one direction to and away from a stationarily positioned workpiece, said workpiece having a centerline in axial alignment with said axial centerline of said hollow shaft, means for rotating said hollow shaft at a relatively low speed about its longitudinal axis, a cutting tool holder, said cutting tool holder having an axial centerline, a recessed portion formed in said cutting tool holder, at least one radially disposed cutting edge supported within said recessed portion adjacent an outer end of said cutting tool holder, means connecting said cutting tool holder adjacent one end of said hollow shaft for axial and rotatable movement therewith, said connecting means comprising adjustable means to adjustably position said cutting holder with respect to said hollow shaft so that the axial centerline of said cutting tool holder angularly deviates from the axial centerline of said hollow shaft in a radial pattern from a point spaced inward from said hollow shaft toward the end of said hollow shaft in juxtaposition to said workpiece to thereby adjust the angular disposition of said cutting tool with respect to said workpiece, means connected with said adjustable means for rotating said cutting tool holder at a speed relatively higher than the speed of rotation of said hollow shaft to orbitally revolve said cutting tool edge around said workpiece, means supported on said box frame and operably associated with said shaft rotating means for axially moving said hollow shaft toward said workpiece with said workpiece received in said cutting tool holder recess to thereby move said cutting tool along the portion of the length of said workpiece while said cutting tool revolves around said workpiece, means adjustably supported on said box frame for setting the distance of axial movement of said hollow shaft in said one direction, said last stated means comprising means to stop said hollow shaft in its axial movement when said hollow shaft has traveled said distance in said one direction, means supported on said cutting tool holder means for moving said cutting tool out of contact with said workpiece when the axial movement of said hollow shaft in said one direction has been stopped, means supported on said box frame and engaged with said hollow shaft for axially moving and resetting said hollow shaft in a second direction back to its initial position after said cutting tool has been moved out of contact with said workpiece.

2. A machine as defined in claim 1 wherein said cutting tool holder connecting means comprises a flange member secured adjacent one end of said hollow shaft for rotation therewith, a head holder, means slidably mounting said head holder on said flange member for rotation therewith, means for angularly adjusting said head holder relative to said flange member in two diametric opposite directions radial to its axis of rotation, a head member, means slidably mounting said head member on said head holder for rotation therewith, means angularly adjusting said head member relative to said holder in two diametrically opposite directions radial to its axis of rotation and normal to said directions of angular adjustment of said head holder, and a driving shaft mounted within said head member and having an axial hole formed in one end, said means for rotating said cutting tool holder being connected to said driving shaft and received in said driving shaft hole.

3. The machine as defined in claim 2 wherein said cutting tool holder connecting means further includes:

a square cylinder pivotally mounted within said head member;

a pair of aligned pins secured in a pair of opposite side walls of said head member and associated with said square cylinder to allow pivotal movement of said square cylinder in said directions of angular adjustment of said head member;

said bearings coaxially mounted within said square cylinder and supporting said driving shaft thereon.

4. The machine as defined in claim 2 wherein said means for rotating said cutting tool holder is rotatably and axially movably supported within said hollow shaft and comprises:

a front spindle slidably keyed in said axial hole of said driving shaft at one end and forming said one end of said cutting tool holder rotating means;

an intermediate spindle having one end connected by a universal joint with the other end of said front spindle;

a rear spindle having one end connected by a universal joint with the other end of said intermediate spindle, means supporting said rear spindle for axial movement with said hollow shaft, and means for rotating said rear spindle about its own longitudinal axis at a speed relatively higher than the speed of rotation of said hollow shaft to thereby rotate said intermediate and front spindles for rotating said driving shaft and said cutting tool holder secured thereto at a relatively high speed, the other end of said rear spindle projecting from said hollow shaft;

and gear means supported on said box frame and slidably keyed to said other end of said rear spindle.

5. The machine as defined in claim 1 wherein said means for axially moving said hollow shaft comprises:

a screw shaft rotatably supported on said box frame in parallel relation to said hollow shaft and having an external thread formed thereon, means rotating said screw shaft about its own longitudinal axis simultaneously with said hollow shaft at a speed variable relative to the speed of rotation of said hollow shaft;

a support ring encircling and secured to said hollow shaft and having a peripheral groove formed thereon;

a movable plate pivotally supported on said hollow shaft and having one end formed with a circular hole, the circumferential edge of said circular hole being slidably received in said peripheral groove of said support ring, the opposite end of said movable plate from said circular hole being provided with an insert member having an internal thread formed thereon, said internal thread being engageable with said external thread on said screw shaft to thereby move said movable plate laterally along the longitudinal axis of said hollow shaft with the rotation of said screw shaft;

and gear means operationally connected with said hollow shaft rotating means and including variable speed gear means for rotating said screw shaft at said variable speed.

6. The machine as defined in claim 1 wherein said means for setting the distance of axial movement of said hollow shaft and stopping said axial movement comprises:

a transfer shaft, means for slidably and rotatably supporting said transfer shaft on said box frame in parallel relation to said screw shaft and having an externally threaded intermediate portion, said transfer shaft being encircled by a pair of spaced, parallel rings secured thereto adjacent to one end thereof in a position substantially above said opposite end of said movable plate;

a stopper member having an internal thread thereon and screwed on said threaded portion of said transfer shaft, said stopper member being reciprocable to and from said movable plate with the rotation of said transfer shaft slidingly relative to said box frame to thereby adjust the distance between said movable plate and said stopper member for setting said distance of said axial movement of said hollow shaft;

a spline shaft rotatably supported on said box frame in parallel relation to said transfer shaft;

said movable plate adapted to abut against said stopper member during its lateral movement to thereby cause said transfer shaft to move axially slidingly relative to said box frame in the direction of said axial movement of said hollow shaft, said opposite end of said movable plate being movable between a first position and a second position about said support ring;

and means associated with said transfer shaft and actuatable by said axial movement thereof for rotating said spline shaft in one direction to cause pivotal movement of said movable plate to said second position about said support ring and thereby disengage said insert member from said screw shaft.

7. The machine as defined in claim 6 wherein said means for rotating said spline shaft in said one direction and causing said pivotal movement of said movable plate to said second position comprises:

a first arm member pivotally carried on said spline shaft at one end, the other end of said first arm member being movable between a first position and a second position about said spline shaft;

a slide member slidably mounted on said box frame and extending below said spline shaft in a direction normal to the longitudinal axis of said spline shaft, said slide member being slidable between a first position and a second position along its length and drivingly engage said other end of said first arm member;

a spring associated with said slide member for urging said slide member toward said second position;

a latch member pivotally attached to said box frame at one end and engaged with said slide member at the other end to releasably hold said slide member against the action of said spring;

a short shaft, means rotatably supporting said short shaft on said box frame and extending in a direction parallel to said slide member and said latch member and normal to said transfer shaft, said short shaft having a first eccentric pin projecting from one end thereof and a second eccentric pin projecting from the other end thereof, said first eccentric pin being slidably received between said spaced, parallel rings on said transfer shaft and movable upon said axial movement of said transfer shaft to thereby rotate said short shaft in one direction, whereby said second eccentric pin is moved from a first position to a second position;

a connecting member movable between a first position and a second position along its length and connecting said second eccentric pin with said other end of said latch member, said connecting member being movable from said first position to said second position upon movement of said second eccentric pin from said first position to said second position for causing pivotal movement of said latch member to release said slide member for sliding movement to said second position by the action of said spring, whereby said other end of said first arm member is moved from said first position to said second position to rotate said spline shaft in said one direction;

a second arm member pivotally and slidably carried on said spline shaft at one end, the other end of said second arm member projecting ahead of said opposite end of said movable plate and being movable from a first position to a second position upon rotation of said spline shaft in said one direction;

and a pin on said other end of said second arm member engaged with said opposite end of said movable plate for causing said pivotal movement of said movable plate to said second position.

8. The machine as defined in claim 2 wherein said means for moving said cutting tool from contact with said workpiece comprises:

frame means secured to said flange member on said hollow shaft, said frame means being rotatable and axially movable with said hollow shaft;

a rotatable support member supported on said box frame rotatably with said frame means and axially immovably, said rotatable support member extending in spaced, parallel relation to said head holder and said head member and having a hollow internal space with an opening facing said head holder and said head member;

a templet laterally slidably received in said hollow internal space and having one side facing said head holder and said head member through said opening, said templet being provided with a pair of spaced, parallel grooves laterally formed on the opposite side thereof from said one side;

a movable element mounted within said hollow internal space of said rotatable support member on the opposite side of said templet from said head holder and said head member, said movable element being movable along its length between a first position and a second position relative to said templet, said movable element having one side facing said opposite side of said templet, said one side of said movable element being provided with a pair of spaced, parallel projections laterally formed thereon in parallel relation to said grooves on said templet, said projections on said movable element being in staggered relation to said grooves on said templet when said movable element is in said first position, but engageable therewith upon movement of said movable element to said second position, said projections in said staggered relation to said grooves urging said templet toward said head holder;

a first spring mounted on said rotatable support member for urging said movable element toward said second position;

a pawl member pivotally attached to said rotatable support member at one end and engaged at the other end with said movable element to releasably hold said movable element in said first position against the action of said first spring;

a pawl disengaging member adjustably secured to said frame means and engageable with said pawl member to disengage said pawl member from said movable element upon axial movement of said frame means over a preadjusted distance corresponding to a predetermined length of said workpiece along which a thread is to be formed;

a stylus member attached to said head holder and slidably engaged with said one side of said templet;

and means associated with said head holder in diametrically opposite relation to said stylus member to press said stylus member against said templet for urging said templet into sliding displacement for engagement of said grooves thereon with said projections on said movable element upon movement of said movable element to said second position, whereby said head holder is allowed to laterally move relative to said flange member and said cutting tool holder is laterally moved with said head head holder to move said cutting tool from contact with said workpiece.

9. The machine as defined in claim 8 wherein said means for urging said templet into sliding displacement comprises:

a bracket secured to said flange member in diametrically opposite relation to said frame means and formed with a hole facing said head holder and having a longitudinal axis radial thereto, said hole being substantially in alignment with said stylus member;

a stud connected with said head holder at one end and received in said hole at the other end;

and a second spring mounted within said hole and fastened to said other end of said stud for urging said stylus member against said templet to thereby cause said sliding displacement of said templet in cooperation with said first spring.

10. The machine as defined in claim 7 wherein said means for axially moving back said hollow shaft comprises:

a flange formed on said spline shaft on the opposite side of said second arm member from said movable plate;

and a spring interposed between said flange and said second arm member for urging said movable plate away from said flange, said spring being actuatable upon said movement of said movable plate to said second position to spring back said movable plate and thereby move back said hollow shaft to its initial position.

11. The machine as defined in claim 10 wherein said hollow shaft resetting means comprises:

a flange formed on said transfer shaft radially thereto in a position adjacent to one inner side wall of said box frame;

a spring encircling said transfer shaft and interposed between said flange and said one inner side wall of said box frame for axially moving back said transfer shaft upon said springing back of said movable plate to rotate said short shaft in a direction opposite to said one direction, whereby said connecting member is moved from said second position to said first position to make said latch member engageable with said slide member;

a stop member attached to said box frame and having a beveled bottom surface;

an abutment member attached to said movable plate for abutting against said stop member when said hollow shaft has been axially moved back to its initial position;

and said spring on said spline shaft loaded heavily enough to press said second arm member against said movable plate even after said abutment member has abutted against said stop member, and thereby cause said abutment member to slide down on said beveled bottom surface on said stop member, whereby said movable plate is moved from said second position to said first position to engage said insert member with said screw shaft and move said second arm member from said second position to said first position for rotating said spline shaft in a direction opposite to said one direction, said rotation of said spline shaft in said opposite direction moving said first arm member from said second position to said first position to thereby move said slide member from said second position to said first position, whereby said slide member is engaged by said latch member to maintain said movable plate in said first position.

12. A screw cutting machine comprising in combination, a box frame, a hollow shaft, means supporting said shaft on said frame, means for rotating said shaft at a relatively low speed, means cooperating with said shaft supporting means for axially reciprocating said shaft to and from work stationarily positioned in close juxtaposition thereto, a spindle supported on bearings within said shaft, key means slidably keying said spindle within said hollow shaft, means for rotating said spindle within said shaft at a speed relatively higher than said shaft rotation speed, a cutting tool holder attached to said spindle for rotation therewith, said holder supporting at least one cutting tool thereon, means for shifting the angular disposition of said cutting tool with respect to said work, means for adjustably radially setting the cutting tool holder on the spindle, means for moving the cutting tool to and from the work whereby the cutting tool may be shifted in accordance with the lead angle to be cut by said cutting tool, and means for setting said cutting tool to effect a screw cut of predetermined depth in the work, and means for moving the cutting tool from contact with the work after cutting a predetermined length thereon.

13. The structure as set forth in claim 12, wherein the means for setting the depth of cut in the work comprises a flange member fixedly attached to the rotatable hollow shaft, a head holder mounted on said flange for movement in a direction normal to the longitudinal axis of said shaft, a head member slidably mounted on said holder, a cylinder on said holder pivotally supported on said head member for adjustment with respect thereto, bearings in said cylinder, a driving shaft supported on said cylinder bearings, means for attaching said cutting tool holder to said driving shaft, and means including a template for controllably adjusting the position of said cylinder during its rotation ith said hollow shaft.

14. The structure as set forth in claim 13, wherein the means for axially reciprocating said hollow shaft comprises a motor having a shaft mounted on said main frame, speed change gear means drivingly connected to said motor shaft and to said hollow shaft at the end of said hollow shaft remote from the work, a feed screw supported on the box frame, a driven gear on said feed screw shaft connected to said speed change gear means on said hollow shaft, said driven gear yieldably connected to said feed screw shaft for reversing the axial movement of said hollow shaft.

15. The structure of claim 12, wherein the means for effecting a cut in the screw of predetermined length comprises a transfer shaft slidably and rotatably mounted on said box frame, a graduated dial mounted on said transfer shaft, a flange on said transfer shaft, loaded spring means between said flange and said box frame, a feed stopping plate on said shaft, a movable plate loosely mounted on said hollow shaft adapted to be placed in abutting relation to said feed stopping plate when said movable plate is moved with said hollow shaft.

* * * * *